(12) United States Patent
Wang et al.

(10) Patent No.: US 9,065,114 B2
(45) Date of Patent: Jun. 23, 2015

(54) CATHODE OF LITHIUM ION BATTERY AND METHOD FOR FABRICATING THE SAME

(75) Inventors: Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 635 days.

(21) Appl. No.: 12/862,760

(22) Filed: Aug. 25, 2010

(65) Prior Publication Data

US 2011/0262805 A1 Oct. 27, 2011

(51) Int. Cl.
| | |
|---|---|
| *H01M 4/13* | (2010.01) |
| *B82Y 30/00* | (2011.01) |
| *H01M 4/136* | (2010.01) |
| *H01M 4/139* | (2010.01) |
| *H01M 4/1397* | (2010.01) |
| *H01M 4/62* | (2006.01) |
| *H01M 4/66* | (2006.01) |
| *H01M 4/02* | (2006.01) |

(52) U.S. Cl.
CPC ............. *H01M 4/13* (2013.01); *B82Y 30/00* (2013.01); *H01M 4/136* (2013.01); *H01M 4/139* (2013.01); *H01M 4/1397* (2013.01); *H01M 4/621* (2013.01); *H01M 4/623* (2013.01); *H01M 4/625* (2013.01); *H01M 4/661* (2013.01); *H01M 4/663* (2013.01); *H01M 4/667* (2013.01); *H01M 2004/028* (2013.01); *Y02E 60/122* (2013.01)

(58) Field of Classification Search
CPC ..... H01M 4/13; H01M 4/667; H01M 4/1397; H01M 4/139; H01M 4/621; H01M 4/136; H01M 4/663; H01M 4/625; H01M 4/661; H01M 4/623; H01M 2004/028; B82Y 30/00; Y02E 60/122
USPC ................... 429/209, 122, 126, 128
See application file for complete search history.

(56) References Cited

U.S. PATENT DOCUMENTS

| | | | | | |
|---|---|---|---|---|---|
| 2,642,628 | A | * | 6/1953 | Zimmerman | 264/105 |
| 2,644,761 | A | * | 7/1953 | McGirr | 106/18.18 |
| 4,556,618 | A | * | 12/1985 | Shia | 429/217 |
| 2003/0091890 | A1 | * | 5/2003 | Fukuda et al. | 429/42 |
| 2008/0248235 | A1 | | 10/2008 | Feng et al. | |
| 2009/0297952 | A1 | | 12/2009 | Yasunaga et al. | |

FOREIGN PATENT DOCUMENTS

CN 101090154 12/2007
(Continued)

OTHER PUBLICATIONS

Websters New World Dictionary 2nd College Ed. 1972: Calender, col. 2 p. 200.*
(Continued)

*Primary Examiner* — Patrick Ryan
*Assistant Examiner* — Aaron Greso
(74) *Attorney, Agent, or Firm* — Novak Druce Connolly Bove + Quigg LLP

(57) ABSTRACT

A method for making a cathode of lithium ion battery is provided. A paste mixture including active material of lithium ion battery cathode and adhesive is provided first. Then the paste mixture is pressed to get a sheet structure. The sheet structure has a surface. A carbon nanotube layer structure is applied on the surface of the sheet structure to form a precursor. Then the precursor is curled to form a curled precursor, and the curled precursor is pressed and dried.

18 Claims, 3 Drawing Sheets

(56) References Cited

FOREIGN PATENT DOCUMENTS

| CN | 101154730 | | 4/2008 | |
|---|---|---|---|---|
| JP | 2007-329107 | * | 6/2006 | ............ H01M 10/40 |
| TW | 200833862 | | 8/2008 | |
| WO | WO 2008/113023 | * | 9/2008 | .............. H01M 4/60 |

OTHER PUBLICATIONS

Websters New World Dictionary 2nd Col ed 1972 Paste p. 1039 col. 2.*

Real Dictionary CURL and synonyms 2001 available May 26, 2003 Princeton University, Princeton NJ USA.*

* cited by examiner

CATHODE OF LITHIUM ION BATTERY AND METHOD FOR FABRICATING THE SAME

RELATED APPLICATIONS

This application claims all benefits accruing under 35 U.S.C. §119 from China Patent Application No. 201010157435.9, filed on Apr. 27, 2010 in the China Intellectual Property Office, the contents of which are hereby incorporated by reference.

BACKGROUND

1. Technical Field

The present disclosure relates to cathodes of lithium batteries and methods for fabricating the same.

2. Description of Related Art

Lithium batteries are used in various portable devices, such as notebook PCs, mobile phones, and digital cameras because of their small weight, high discharge voltage, long cyclic life, and high energy density compared with conventional lead storage batteries, nickel-cadmium batteries, nickel-hydrogen batteries, and nickel-zinc batteries.

A cathode of a lithium ion battery should have such properties as high energy density; high open-circuit voltage versus metallic lithium electrode; high capacity retention; good performance in common electrolytes; high density; good stability during charge and discharge processes, and low cost. Among various active materials, transition metal oxides and mixed transition metal oxides have received much attention owing to their relatively high charge/discharge capacities in the lithium batteries. At present, the most widely used cathode active materials are spinel type lithium manganese oxide (e.g. $LiMn_2O_4$), olivine type lithium iron phosphate (e.g. $LiFePO_4$), and layered type lithium cobalt oxide (e.g. $LiCoO_2$).

However, the low conductivity of the active materials generally induces a relatively large resistance in the cathode. As such, the charge/discharge depth of the lithium ion battery is relatively low. To decrease the resistance of the cathode, a conducting additive is commonly mixed with the active material. The weight of the conducting additive can reach to about 10% of the total weight of the cathode. If the conducting additive is increased, the weight and the volume of the battery will increase.

What is needed, therefore, is a cathode of lithium ion battery and method for making the same that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
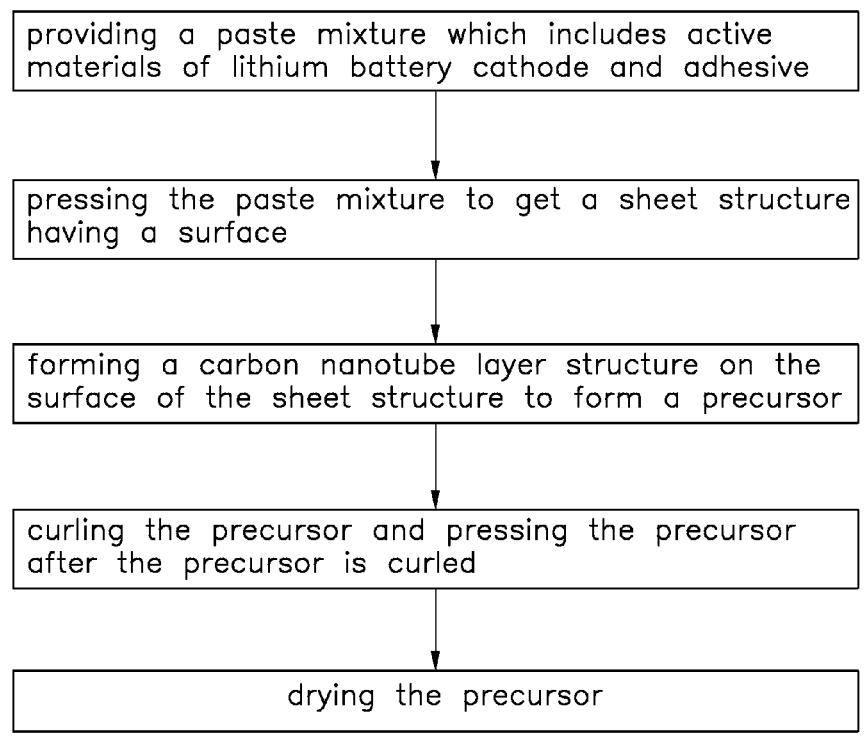
FIG. 1 is a flow chart of a method according to one embodiment for making a cathode of lithium ion battery.

Referring to FIG. 1, a method for making a cathode of lithium ion battery according to one embodiment is shown. The method includes the following steps:

S1: providing a paste mixture that includes active material of lithium ion battery cathode and adhesive;

S2: pressing the paste mixture into a sheet structure having a surface;

S3: applying a carbon nanotube layer structure on the surface of the sheet structure to form a precursor;

S4: curling the precursor to form a curled precursor;

S5: pressing the curled precursor; and

S6: drying the precursor.

In step S1, the active material can be spinel type lithium manganese oxide (e.g. $LiMn_2O_4$), olivine type lithium iron phosphate (e.g. $LiFePO_4$), layered type lithium cobalt oxide (e.g. $LiCoO_2$) or combination thereof.

The adhesive includes adhesive material and solvent. The adhesive material can be fluorine resins or polyolefin compounds. The polyolefin compounds can be polyvinylidene fluoride (PVDF), polytetrafluoroethylene (PTFE), styrene butadiene rubber, or combination thereof. The solvent can be ethanol, glycol, N-Methyl Pyrrolidone (NMP), or combination thereof. A weight ratio of the adhesive materials in the adhesive can be in a range from about 5% to about 60%.

In step S1, a method for making the paste mixture includes the following steps: S11: providing the adhesive including the adhesive material and the solvent; and S12: adding a number of active material powders into the adhesive and stirring them to form the paste mixture.

In step S12, a weight ratio of the active material and the adhesive material is in a range from about 5:1 to about 20:1. In one embodiment, the active material is $LiFePO_4$, the adhesive material is PTFE, and the solvent is water. And the weight ratio between $LiFePO_4$ and PTFE is about 8:1.

Alternatively, before step S12, a number of carbon black particles can be added into the adhesive. A weight ratio between the carbon black particles and the active material is less than 1:10, especially less than 1:50.

In step S2, the paste mixture can be pressed by a planar structure or by a roller. In one embodiment, the paste mixture can be pressed directly. In another embodiment, the paste mixture can be wrapped by a flexible material and then pressed. In one embodiment, the following steps can be performed to press the paste mixture: first, putting the paste mixture in an aluminum foil and wrapping the paste mixture with the aluminum foil. Second, putting the paste mixture wrapped by the aluminum foil between two rollers and rolling the paste mixture wrapped by the aluminum foil; last, tearing off the aluminum foil to get the sheet structure. In this embodiment, the flexible material protects the paste mixture from contaminants from the rollers.

In step S3, the carbon nanotube layer structure can be formed by coating method or spraying method. In one embodiment, the carbon nanotube layer structure is a free standing carbon nanotube layer structure. The free standing carbon nanotube layer structure can be supported by itself without a substrate (e.g. when at least one point of the carbon nanotube layer structure is held, the entire carbon nanotube layer structure can be lifted without being destroyed). The free standing carbon nanotube layer structure can be laid on the surface of the sheet structure directly. The carbon nanotube layer structure can be a film structure with a thickness ranging from about 0.5 nanometers (nm) to about 1 mm. The carbon nanotube layer structure can include at least one carbon nanotube film. The carbon nanotube film includes a plurality of carbon nanotubes disposed uniformly. The carbon nanotube film can be adhesive. The carbon nanotube film can be a drawn carbon nanotube film, a pressed carbon nanotube film, or a flocculated carbon nanotube film.

A method of making a drawn carbon nanotube film includes the steps of:

S31: providing an array of carbon nanotubes; and
S32: pulling out at least a drawn carbon nanotube film from the carbon nanotube array.

In step S31, a method of making the array of carbon nanotubes includes:

S311: providing a substantially flat and smooth substrate;
S312: applying a catalyst layer on the substrate;
S313: annealing the substrate with the catalyst at a temperature in the approximate range of about 700° C. to about 900° C. in air for about 30 to about 90 minutes;
S314: heating the substrate with the catalyst at a temperature in the approximate range from about 500° C. to about 740° C. in a furnace with a protective gas therein; and
S315: supplying a carbon source gas to the furnace for about 5 to about 30 minutes and growing a super-aligned array of the carbon nanotubes from the substrate.

In step S311, the substrate can be a P or N-type silicon wafer. In one embodiment, a 4-inch P-type silicon wafer is used as the substrate.

In step S312, the catalyst can be made of iron (Fe), cobalt (Co), nickel (Ni), or any combination alloy thereof.

In step S314, the protective gas can be made up of at least one of nitrogen ($N_2$), ammonia ($NH_3$), and a noble gas.

In step S315, the carbon source gas can be a hydrocarbon gas, such as ethylene ($C_2H_4$), methane ($CH_4$), acetylene ($C_2H_2$), ethane ($C_2H_6$), or any combination thereof.

In step S32, the drawn carbon nanotube film can be fabricated by the steps of:

S321: selecting one or more carbon nanotubes having a predetermined width from the array of carbon nanotubes; and
S322: pulling the carbon nanotubes to obtain nanotube segments at an even/uniform speed to achieve a uniform carbon nanotube film.

In step S321, the carbon nanotube segment includes a number of substantially parallel carbon nanotubes. The carbon nanotube segments can be selected by using an adhesive tape as the tool to contact the super-aligned array of carbon nanotubes. In step S322, the pulling direction can be substantially perpendicular to the growing direction of the super-aligned array of carbon nanotubes.

More specifically, during the pulling process, as the initial carbon nanotube segments are drawn out, other carbon nanotube segments are also drawn out end to end due to Van der Waals attractive force between ends of adjacent segments. This process of pulling produces a substantially continuous and uniform carbon nanotube film having a predetermined width can be obtained.

After the step of S32, the drawn carbon nanotube film can be treated by applying organic solvent to the drawn carbon nanotube film to soak the entire surface of the carbon nanotube film. The organic solvent is volatile and can be selected from ethanol, methanol, acetone, dichloromethane, chloroform, or any appropriate mixture thereof. In the one embodiment, the organic solvent is ethanol. After being soaked by the organic solvent, adjacent carbon nanotubes in the carbon nanotube film that are able to do so, bundle together, due to the surface tension of the organic solvent when the organic solvent is volatilizing. In another aspect, due to the decrease of the specific surface area from bundling, the mechanical strength and toughness of the drawn carbon nanotube film are increased and the coefficient of friction of the carbon nanotube films is reduced. Macroscopically, the drawn carbon nanotube film will be an approximately uniform film.

The width of the drawn carbon nanotube film depends on the size of the carbon nanotube array. The length of the drawn carbon nanotube film can be set as desired. In one embodiment, when the substrate is a 4 inch type wafer, a width of the carbon nanotube film can be in an approximate range from 1 centimeter (cm) to 10 cm, the length of the carbon nanotube film can reach to about 120 m, the thickness of the drawn carbon nanotube film can be in an approximate range from 0.5 nm to 100 microns. Multiple films can be adhered together to obtain a film of any desired size.

A method of making the pressed carbon nanotube film includes the following steps:

S31': providing a carbon nanotube array and a pressing device; and
S32': pressing the array of carbon nanotubes to obtain a pressed carbon nanotube film.

In step S31', the carbon nanotube array can be made by the same method as S31.

In the step S32', a certain pressure can be applied to the array of carbon nanotubes by the pressing device. In the process of pressing, the carbon nanotubes in the array of carbon nanotubes separate from the substrate and obtain the carbon nanotube film under pressure. The carbon nanotubes are substantially parallel to a surface of the carbon nanotube film.

In one embodiment, the pressing device can be a pressure head. The pressure head has a smooth surface. The shape of the pressure head and the pressing direction can determine the direction of the carbon nanotubes arranged therein. When a pressure head (e.g. a roller) is used to travel across and press the array of carbon nanotubes along a predetermined single direction, a carbon nanotube film having a number of carbon nanotubes primarily aligned along a same direction is obtained. It can be understood that there may be some variation in the film. Different alignments can be achieved by applying the roller in different directions over an array. Variations on the film can also occur when the pressure head is used to travel across and press the array of carbon nanotubes several times, variation will occur in the orientation of the nanotubes. Variations in pressure can also achieve different angles between the carbon nanotubes and the surface of the semiconducting layer on the same film. When a planar pressure head is used to press the array of carbon nanotubes along the direction perpendicular to the substrate, a carbon nanotube film having a number of carbon nanotubes isotropically arranged can be obtained. When a roller-shaped pressure head is used to press the array of carbon nanotubes along a certain direction, a carbon nanotube film having a number of carbon nanotubes aligned along the certain direction is obtained. When a roller-shaped pressure head is used to press the array of carbon nanotubes along different directions, a carbon nanotube film having a number of sections having carbon nanotubes aligned along different directions is obtained.

The flocculated carbon nanotube film can be made by the following method:

S31": providing a carbon nanotube array;
S32": separating the array of carbon nanotubes from the substrate to get a number of carbon nanotubes;

S33″: adding the number of carbon nanotubes to a solvent to get a carbon nanotube floccule structure in the solvent; and S34″: separating the carbon nanotube floccule structure from the solvent, and shaping the separated carbon nanotube floccule structure into a carbon nanotube film to achieve a flocculated carbon nanotube film.

In step S31″, the carbon nanotube array can be fabricated by the same method as step S31.

In step S32″, the array of carbon nanotubes is scraped off the substrate to obtain a number of carbon nanotubes. The length of the carbon nanotubes can be above 10 microns.

In step S33″, the solvent can be selected from water or volatile organic solvent. After adding the number of carbon nanotubes to the solvent, a process of flocculating the carbon nanotubes can, be suitably executed to create the carbon nanotube floccule structure. The process of flocculating the carbon nanotubes can be selected from ultrasonic dispersion of the carbon nanotubes or agitating the carbon nanotubes. In one embodiment ultrasonic dispersion is used to flocculate the solvent containing the carbon nanotubes for about 10~30 minutes. Due to the carbon nanotubes in the solvent having a large specific surface area and the tangled carbon nanotubes having a large Van der Waals attractive force, the flocculated and tangled carbon nanotubes obtain a network structure (e.g., floccule structure).

In step S34″, the process of separating the floccule structure from the solvent includes the sub-steps of:

S34″1: filtering out the solvent to obtain the carbon nanotube floccule structure; and S34″2: drying the carbon nanotube floccule structure to obtain the separated carbon nanotube floccule structure.

In step S34″1, the carbon nanotube floccule structure can be disposed in room temperature for a period of time to dry the organic solvent therein. The time of drying can be selected according to practical needs. The carbon nanotubes in the carbon nanotube floccule structure are tangled together.

In step S34″2, the process of shaping includes the sub-steps of:

S34″21: putting the separated carbon nanotube floccule structure on a supporter (not shown), and spreading the carbon nanotube floccule structure to obtain a predetermined structure;

S34″22: pressing the spread carbon nanotube floccule structure with a determined pressure to yield a desirable shape; and S34″23: removing the residual solvent contained in the spread floccule structure to obtain the flocculated carbon nanotube film.

Through the flocculating, the carbon nanotubes are tangled together by Van der Walls attractive force to obtain a network structure/floccule structure. Thus, the flocculated carbon nanotube film has good tensile strength.

In step S4, the carbon nanotube layer structure is wrapped by the sheet structure when the precursor is curled. The precursor is curled to form a curled precursor and has a shape of a column structure or a cone structure.

In step S5, the curled precursor can be pressed by a planar structure or by a roller. In one embodiment, the curled precursor can be pressed directly. In another embodiment, the curled precursor can be wrapped by a flexible material and then pressed. In one embodiment, the precursor after being curled can be pressed by the following steps: firstly, wrapping the curled precursor with an aluminum foil; secondly, putting the curled precursor wrapped by the aluminum foil between two rollers and rolling the curled precursor; lastly, tearing off the aluminum foil. The step of pressing the curled precursor disperses the carbon nanotubes in the paste mixture.

In another embodiment, the steps S4 and S5 can be repeated alternatively for several times to make uniformly disperse the carbon nanotubes in the precursor.

In still another embodiment, the steps S3 to S5 can be repeated alternatively in that order to introduce more carbon nanotubes in the precursor and disperse the carbon nanotubes uniformly in the precursor.

The precursor can be further cut to form a number of pieces of precursors with determined size. The precursor has a substantially slice structure.

In step S6, the precursor can be dried at a temperature of about 100 centigrade to about 150 centigrade for about 10 hours to about 40 hours. In step S6, the solvent in the adhesive is removed after the precursor is dried, and the cathode of lithium ion battery is formed. The cathode of lithium ion battery has a slice structure. A dimension of the cathode of lithium ion battery is not limited. A thickness of the cathode of lithium ion battery can be in a range from about 1 micrometer to about 2 millimeters. The shape of the cathode of lithium ion battery can be round or rectangular. If the cathode of the lithium ion battery has a round shape, a diameter of the cathode is not limited, can be in a range from about 1 millimeter to about 10 centimeters. In some embodiments, the diameter of lithium ion battery can be in a range from about 1 millimeter to about 1 centimeter. If the cathode of lithium ion battery has a rectangular shape, a length of the cathode of lithium ion battery can range from about 100 micrometers to about 3 centimeters, a width of the cathode of lithium ion battery can range from about 50 micrometers to about 10 centimeters.

Figure 2:
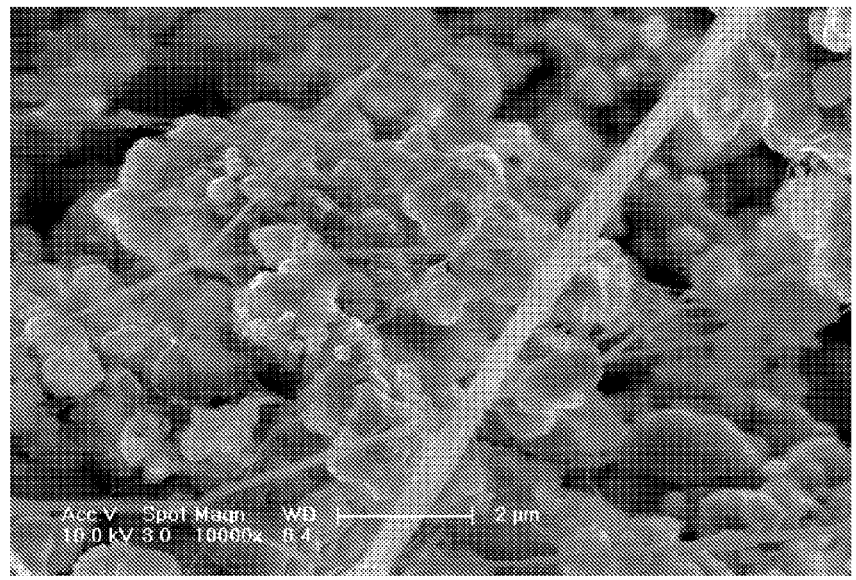
FIG. 2 is a Scanning Electron Microscope image of a cross section of a cathode of lithium ion battery according to one embodiment.

The cathode of lithium ion battery includes active material, adhesive material and a number of carbon nanotubes. The carbon nanotubes can be single-wall carbon nanotubes, double-wall carbon nanotubes or multi-wall carbon nanotubes. A diameter of the carbon nanotubes can be in a range from about 10 nanometers to about 200 nanometers. A length of the carbon nanotubes can be in a range from about 10 micrometers to about 1 centimeter. The length of the carbon nanotubes is longer than about 300 micrometers. When the length of the carbon nanotubes is longer than about 300 micrometers, the cathode of lithium ion battery has better conductivity. Referring to FIG. 2, the active material, the adhesive material, and the carbon nanotubes are mixed uniformly, and the carbon nanotubes are dispersed uniformly in the cathode of lithium ion battery. A weight ratio of the carbon nanotubes in the cathode of lithium ion battery is in a range from about 0.001% to about 1%, particularly, a weight ratio of the carbon nanotubes in the cathode of lithium ion battery is less than 0.1%. In one embodiment, a weigh ratio of the active material, the adhesive material and the carbon nanotubes is about 8:1:0.01. In this embodiment, the carbon nanotubes in the cathode of lithium ion battery are dispersed uniformly and are isotropic, and the cathode of lithium ion battery with the carbon nanotubes has a uniform resistance. The dispersing density of the carbon nanotubes in the cathode of lithium ion battery is about uniform.

Referring to table 1, six cathodes (No. 1 to No. 6) of lithium batteries are shown. Four cathodes of lithium ion battery are provided according to four different embodiments according to the present disclosure and two cathodes of lithium batteries being made by conventional method. Each of the six cathodes of lithium batteries has the same dimensions and are rectangular; thickness of each cathode of lithium ion battery is 0.34 millimeters, length of the cathode of lithium ion battery is 20 millimeters; and width of each cathode of lithium ion battery is 8 millimeters. The active material is $LiFePO_4$, the adhesive material is PTFE, and a weight ratio between $LiFePO_4$ and PTFE is 8:1. From table 1, we can find that, the resistivity of the four cathodes of lithium ion battery (No. 1 to No. 4) is much smaller compared with the cathode lithium ion battery (No. 6) without carbon nanotubes and carbon black particles. The resistivity of the four cathodes of lithium ion battery (No.

1 to No. 4) is almost the same as the resistivity of the cathodes of lithium ion battery (No. 5), however, the weight ratio of the carbon nanotubes in the four cathodes of lithium ion battery (No. 1 to No. 4) is much less than the weight ratio of carbon black particles in the cathode of lithium ion battery (No. 5).

TABLE 1

Compare Table

| No. | Layers of carbon nanotube films in the carbon nanotube layer structure | Repeated times of steps S3 to S5 | Total layers of carbon nanotube films | Weight ratio of carbon nanotubes in the cathodes of lithium ion battery | Weight ratio of carbon black particles in the cathodes of lithium ion battery | Resistivity |
|---|---|---|---|---|---|---|
| 1 | 5 | 4 | 20 | 0.075% | 0 | 3.18E−02 |
| 2 | 2 | 4 | 8 | 0.027% | 0 | 6.00E−02 |
| 3 | 20 | 1 | 20 | 0.074% | 0 | 4.83E−02 |
| 4 | 8 | 1 | 8 | 0.026% | 0 | 6.10E−02 |
| 5 | 0 | 0 | 0 | 0 | 10% | 3.55E−02 |
| 6 | 0 | 0 | 0 | 0 | 0 | 1.76E+00 |

Further, in table 1, comparing the cathode of lithium ion battery of No. 1 with the cathode of lithium ion battery of No. 5, under the condition of the weight of the two cathode of lithium ion batteries is same, the weight of the active materials of the cathode of lithium ion battery of No. 1 is about 10% larger than the weight of the cathode of lithium ion battery of No. 5. The specific capacity of the cathode of lithium ion battery of No. 1 and No. 5 are both about 165 mAh/g, however, because the weight of the active materials of the cathode of lithium ion battery of No. 1 is about 10% larger than the weight of the cathode of lithium ion battery of No. 5, the capacity of the cathode of lithium ion battery of No. 1 is about 10% larger than the capacity of the cathode of lithium ion battery of No. 5 under the condition of the cathode that lithium ion battery of No. 1 and the cathode of lithium ion battery of No. 5 have the same weight.

Figure 3:
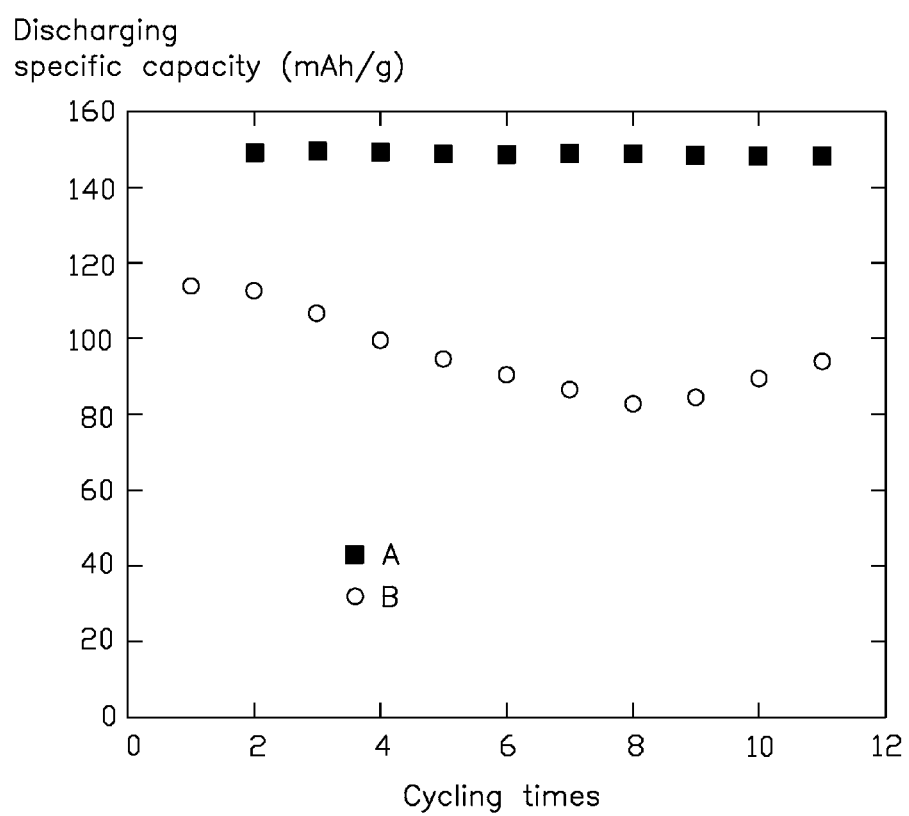
FIG. 3 is a comparison plot between the cathode of lithium ion battery with carbon nanotubes according to an embodiment and a cathode of lithium without carbon nanotubes.

In still another embodiment, the cathode of lithium ion battery can further include a number of carbon black particles, e.g., the cathode of lithium ion battery includes both carbon nanotubes and carbon black particles. A weight ratio of the carbon black particles is less than 10%, in this embodiment, it is less than 1%. The cathode of lithium ion battery including both carbon nanotubes and carbon black particles has good cycling performance. Referring to FIG. 3, the cathode of lithium ion battery A includes $LiCoO_2$, carbon black particles, PTFE and carbon nanotubes, there weight ratio is 8:0.1:1:0.005, cathode of lithium ion battery B includes $LiCoO_2$, carbon black particles and PTFE, their weight ratio is 8:0.1:1. The cathode of lithium ion battery A has better cycling performance and higher capacity than the cathode of lithium ion battery B.

It is to be understood that the above-described embodiments are intended to illustrate rather than limit the present disclosure. Variations may be made to the embodiments without departing from the spirit of the disclosure as claimed. It is understood that any one element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What claimed is:

1. A method for making a cathode of lithium ion battery comprising the following steps:
   providing a paste mixture comprising active material and adhesive;
   pressing the paste mixture into a sheet structure having a surface;
   applying a carbon nanotube layer structure on the surface of the sheet structure to form a precursor;
   curling the precursor to form a curled precursor;
   pressing the curled precursor to disperse carbon nanotubes of the carbon nanotube layer structure in the paste mixture to form a cathode precursor; and
   drying the cathode precursor.

2. The method of claim 1, further comprises a step for making the paste mixture that comprises: providing the adhesive comprising an adhesive material and a solvent; adding active material of lithium ion battery cathode into the adhesive; and stirring them to form the paste mixture.

3. The method of claim 2, wherein a weight ratio of the active material and the adhesive material is in a range from about 5:1 to about 20:1.

4. The method of claim 2, wherein in the step of providing the paste mixture further comprises adding carbon black particles to the adhesive, wherein a weight ratio between the carbon black particles and the active material is less than 0.01:1.

5. The method of claim 1, wherein the step of pressing the paste mixture further comprises pressing the paste mixture, the paste mixture is pressed by a planar structure or by a roller.

6. The method of claim 1, wherein the step of pressing paste mixture comprises the following steps:
   wrapping the paste mixture with a flexible material;
   putting the paste mixture wrapped in the flexible material between two rollers and rolling; and
   removing the flexible material.

7. The method of claim 1, wherein in the step of applying the carbon nanotube layer structure on the surface of the sheet structure comprises applying the carbon nanotube layer structure on the surface of the sheet structure by coating method or spraying method.

8. The method of claim 1, wherein the carbon nanotube layer structure is a free-standing structure, and the carbon nanotube layer structure is laid on the surface of the sheet structure directly.

9. The method of claim 1, wherein the carbon nanotube layer structure comprises at least one drawn carbon nanotube film.

10. The method of claim 1, wherein the steps of curling the precursor and pressing the curled precursor are repeated for a plurality of times.

11. The method of claim 1, wherein the step of applying the carbon nanotube layer structure on the surface of the sheet structure to form the precursor and the step of curling the precursor to form the curled precursor and the step of pressing the curled precursor are alternatively repeated for a plurality of times.

12. The method of claim 1, further comprising wrapping the curled precursor in a flexible material.

13. The method of claim 1, wherein in the step of pressing the curled precursor comprises the following steps: putting the precursor after being curled in an aluminum foil film and wrapping the paste mixture with the aluminum foil film; putting the precursor after being curled and wrapped by the aluminum foil film between two rollers and rolling the precursor; and tearing off the aluminum foil film.

14. The method of claim 1, wherein the step of drying the precursor comprises drying the precursor at a temperature of about 100° C. to about 150° C. for about 10 hours to about 40 hours.

15. A method for making a cathode of lithium ion battery comprising:
    providing a substrate having a surface, the substrate being made of a paste mixture comprising active material of lithium ion battery cathode and adhesive;
    applying a carbon nanotube layer structure on the surface of the substrate to form a precursor;
    curling the precursor to form a curled precursor;
    pressing the curled precursor to form a cathode precursor, wherein the carbon nanotubes of the carbon nanotube layer structure are dispersed in the cathode precursor; and
    drying the cathode precursor.

16. The method of claim 15, wherein the curling the precursor to form a curled precursor and the pressing the curled precursor are repeated so that the carbon nanotubes of the carbon nanotube layer structure are uniformly dispersed in the cathode precursor.

17. A method for making a cathode of lithium ion battery comprising:
    applying a carbon nanotube layer on a paste mixture sheet to form a layered structure, wherein the carbon nanotube layer comprises a plurality of carbon nanotubes, and the paste mixture sheet comprises active material of lithium ion battery cathode and adhesive;
    curling the layered structure to form a curled structure;
    pressing the curled structure so that the active material of lithium ion battery, the adhesive, and the plurality of carbon nanotubes are mixed to form a cathode precursor; and
    drying the cathode precursor.

18. The method of claim 17, wherein the curling the layered structure to form a curled structure and the pressing the curled structure are repeated so that the active material of lithium ion battery, the adhesive, and the plurality of carbon nanotubes are uniformly mixed.

* * * * *